United States Patent [19]

Le Devehat

[11] Patent Number: 5,160,173
[45] Date of Patent: Nov. 3, 1992

[54] SELECTIVE PIPE CONNECTION APPARATUS WITH MULTIPLE FLUID INLETS AND OUTLETS

[75] Inventor: Eugene Le Devehat, Saligny, France
[73] Assignee: FMC Corporation, Chicago, Ill.
[21] Appl. No.: 661,798
[22] Filed: Feb. 26, 1991

[30] Foreign Application Priority Data

Mar. 8, 1990 [FR] France ................... 90 03050

[51] Int. Cl.⁵ ............................. F16L 35/00
[52] U.S. Cl. ............................. 285/26; 285/168;
285/181; 285/315; 285/320; 285/326; 285/364;
285/920; 285/912; 285/93; 285/61
[58] Field of Search ............... 285/920, 912, 181, 163,
285/164, 165, 166, 167, 168, 24, 25, 26, 27, 28,
29, 315, 320, 326, 364, 93, 61

[56] References Cited

U.S. PATENT DOCUMENTS

| | | | |
|---|---|---|---|
| 3,664,386 | 5/1972 | Wenzel | 285/165 X |
| 4,176,864 | 12/1979 | Pohl et al. | 285/181 |
| 4,188,050 | 2/1980 | Lochte | 285/920 X |
| 4,207,920 | 6/1980 | Westerhoff | 285/168 X |
| 4,634,150 | 1/1987 | Forster | 285/24 |
| 4,658,874 | 4/1987 | Meyerinck | 285/168 X |
| 4,790,568 | 12/1988 | Skibowski | 285/28 |
| 4,817,662 | 4/1989 | Skibowski | 137/312 |
| 4,915,147 | 4/1990 | Skibowski | 141/181 |

FOREIGN PATENT DOCUMENTS

| | | | |
|---|---|---|---|
| 2426151 | 12/1975 | Fed. Rep. of Germany | 285/168 |
| 2643265 | 3/1978 | Fed. Rep. of Germany | 285/181 |
| 2731434 | 1/1979 | Fed. Rep. of Germany | 285/168 |

Primary Examiner—Dave W. Arola
Attorney, Agent, or Firm—W. W. Ritt; R. E. Parks; R. B. Megley

[57] ABSTRACT

A multiline fluid distribution system having an articulated fluid loading arm, which is swingable in vertical and horizontal planes, for selectively coupling the swingable fluid outlet end of the loading arm to any one of a plurality of parallel fluid transfer lines extending horizontally in a honey comb-like array. The fluid outlet end of the loading arm is supported on and transported by a carriage to the designated fluid transfer line for coupling therewith.

18 Claims, 7 Drawing Sheets

FIG_3B

FIG_3A

FIG_5B

FIG_5A

FIG_6

SELECTIVE PIPE CONNECTION APPARATUS WITH MULTIPLE FLUID INLETS AND OUTLETS

BACKGROUND OF THE INVENTION

This invention concerns an apparatus for selectively connecting any one of a plurality of inlet pipes to any one of a plurality of outlet pipes. It is directed in particular, but not exclusively, to the circulation of petroleum products.

In multiline fluid distribution installations the requirement routinely arises of being able to connect any one of several inlet lines to any one of several outlet lines with the number of inlet and outlet lines possibly being large, for example in the order of 15 or even more.

It has already been envisaged to dispose the inlet lines and the outlet lines in parallel planes and in two directions perpendicular to these planes and to provide the end of each line with a telescopic ferrule adapted to be extended parallel to these planes into contact with the telescopic ferrule of any one of the lines of the other kind. This has various disadvantages, however.

The use of telescopic ferrules leads to problems with sealing, guiding and mechanical stresses which in practice limit the application of this solution to small numbers of inlet and outlet lines. Furthermore, the telescopic ferrule solution is ill suited to automation.

Also, and more importantly, the use of telescopic sections necessarily implies a variation in inside diameter which results in significant local deterioration of the effectiveness of scraping clean the walls of an inlet and an outlet line temporarily connected to distribute a liquid, and to remove any traces of this liquid likely to contaminate another liquid that might then flow in one or other of these lines.

SUMMARY OF THE INVENTION

The invention is directed to alleviating the aforementioned disadvantages by providing a "liquid switching station" formed of pipes which can all be scraped clean, and which lends itself to the (optionally simultaneous) connection of a large number of inlet lines to a large number of outlet lines in all possible combinations and in a way lending itself to automation.

To this end the invention comprises an apparatus for selectively and temporarily connecting any one of a plurality of first fixed pipe sections to any one of a plurality of second fixed pipe sections. The apparatus includes an ordered first plurality of first pipe coupling sections having coupling flanges along an imaginary coupling plane and movable by a specific amount along a plurality of adjacent first guides parallel to a first direction in said imaginary coupling plane and offset parallel to a second direction in said imaginary coupling plane. Each first pipe coupling section is connected by one of a plurality of first deformable pipes to one of the plurality of first fixed pipe sections, which first fixed sections are at least approximately perpendicular to said imaginary coupling plane and offset parallel to said second direction, said first deformable pipes being deformable in planes of deformation parallel to said first direction. The apparatus further includes an ordered second plurality of second pipe coupling sections having coupling flanges along said imaginary coupling plane and movable by a specified amount along a plurality of adjacent second guides at least approximately parallel to said second direction and offset parallel to said first direction. Each of the second pipe coupling sections is connected by one of a plurality of second deformable pipes to one of the plurality of second fixed pipe sections, which second fixed sections are at least approximately perpendicular to the imaginary coupling plane and offset parallel to said first direction, said second deformable pipes being deformable in planes of deformation parallel to said second direction. The plurality of first pipes as a unit face the plurality of second guides as a unit so that each first coupling section can be aligned with any of the second sections and vice versa. Each of the first coupling sections comprises a pipe coupler adapted to couple the flange thereof to that of any of the second coupling sections, and the first and second fixed sections, the first and second deformable pipes and the first and second movable coupling sections have the same constant inside diameter.

The preferred aspects of the invention, some of which may be combined with each other, comprise:

- each first deformable pipe is formed by at least two intermediate sections parallel to the associated plane of deformation parallel to said first direction and articulated to each other and to one of the first fixed sections and to one of the movable coupling sections by pipe swivel joints with axes perpendicular to said plane associated with said first deformable pipe, and each second deformable articulation is formed by at least two intermediate sections parallel to the associated plane of deformation parallel to said second direction and articulated to each other and to one of the second fixed sections and one of the second movable coupling sections by pipe swivel joints with axes perpendicular to said plane associated with said second deformable pipe;
- the first deformable pipes have parallel planes of deformation perpendicular to the imaginary coupling plane, and the second deformable pipes have parallel planes of deformation also perpendicular to the imaginary coupling plane;
- each deformable pipe is made up of two sections;
- the first direction is perpendicular to the second direction;
- the first direction is horizontal and the second direction is vertical;
- each first or second coupling section is mounted on a carriage movable between two of the first or second guides and displaced by a motor associated with said carriage and controlled by a centralized automatic control system;
- said motor is hydraulically operated and is on the carriage;
- each carriage is provided with a position sensor adapted to sense markers characteristic of possible coupling positions of said carriage on a guide associated with said carriage; and
- the first fixed sections and the second fixed sections are each more than five in number, between five and 20, for example, and preferably between eight and 20.

Additional objects, characteristics and advantages of the invention will emerge from the following description given by way of non-limiting example with reference to the appended drawings.

DESCRIPTION OF THE PREFERRED EMBODIMENT

Figure 1:
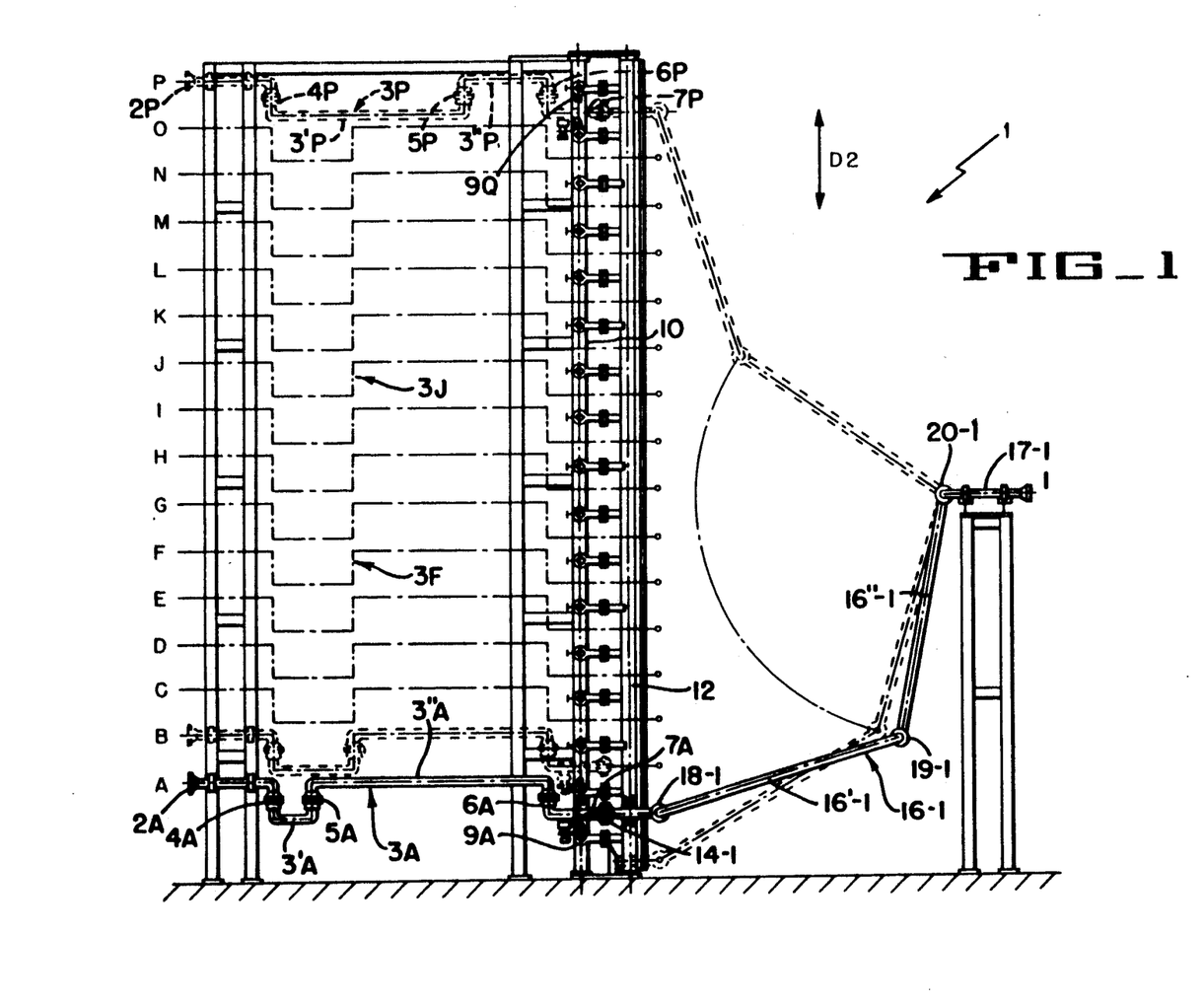
FIG. 1 is a diagrammatic view in elevation of a pipe connection apparatus in accordance with the invention, for selectively connecting a plurality of inlet pipe lines, as viewed in the direction of the arrow D1 in FIG. 2, to a single outlet pipe.
Figure 2:
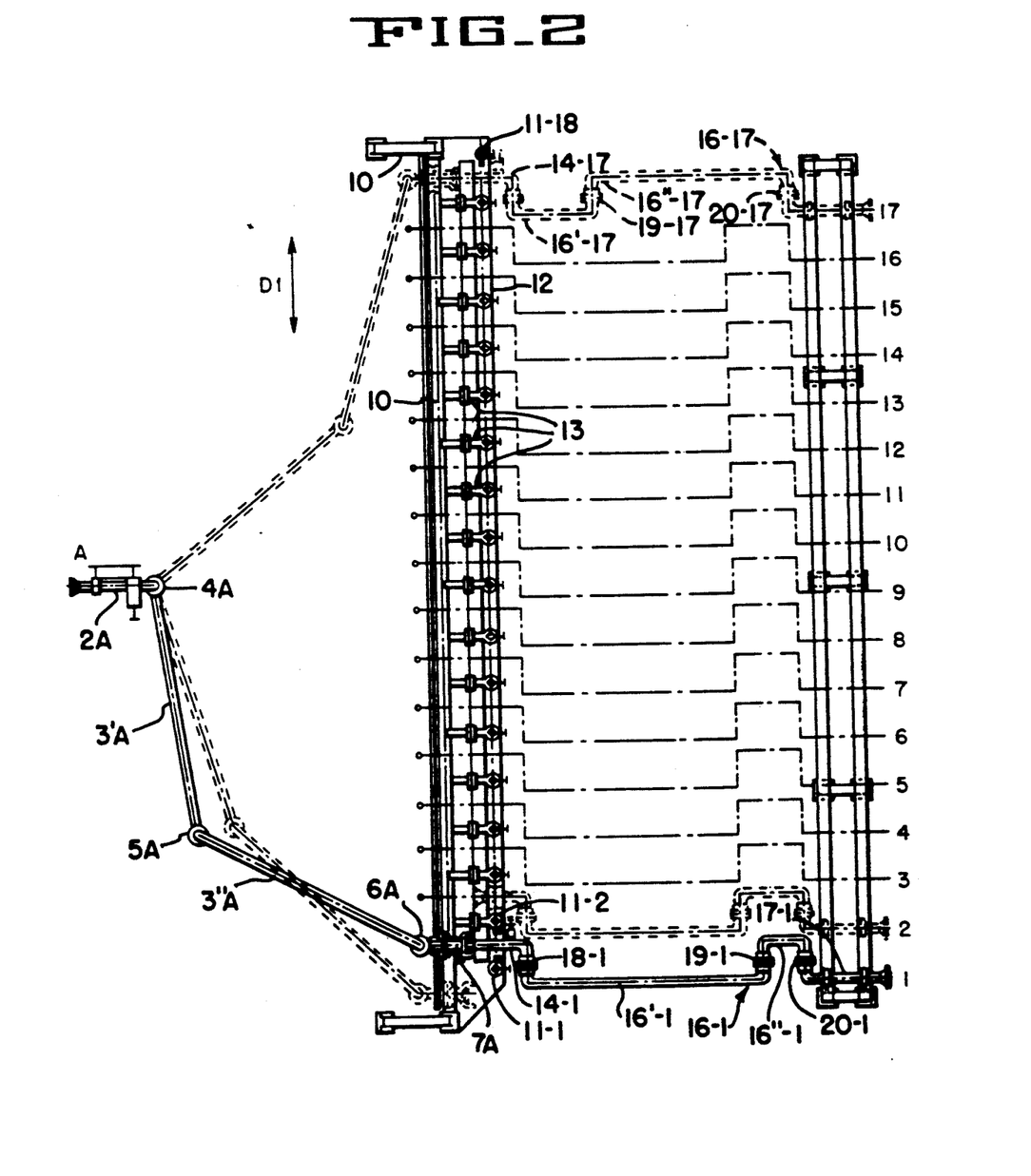
FIG. 2 is a plan view of the FIG. 1 installation showing a single inlet pipe.
Figure 7:
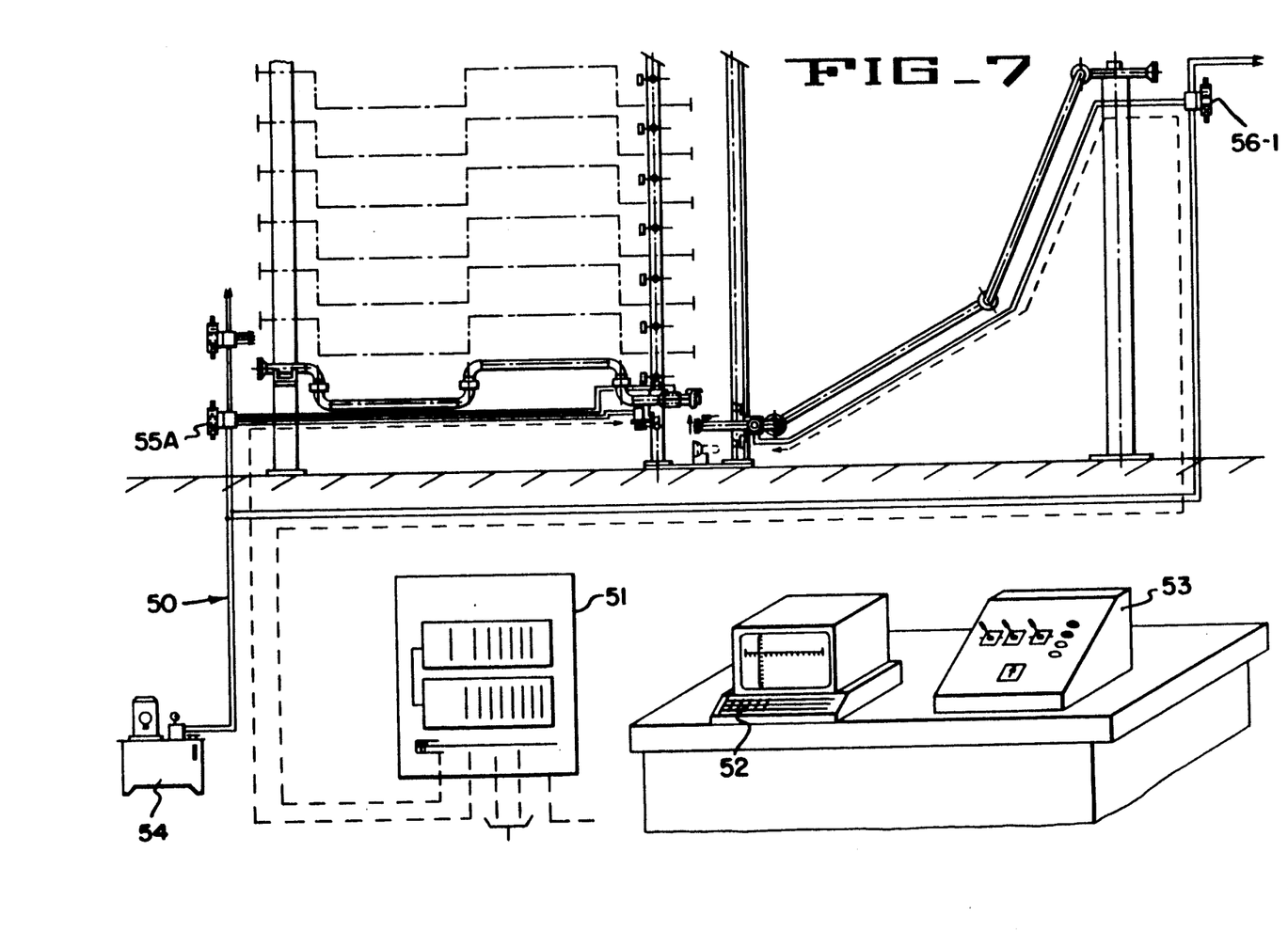
FIG. 7 is a partial schematic view of the installation of FIGS. 1 and 2 with its hydraulic, electronic and data processing equipment.

FIGS. 1, 2 and 7 show a selective connection apparatus 1 adapted to connect any one of multiple inlet pipe lines denoted A through P, to any one of multiple outlet pipe lines denoted 1 through 17. The installation 1 comprises a plurality of first fixed pipe sections 2A through 2P with horizontal parallel axes spaced and residing in a vertical plane, that is aligned parallel in a vertical plane, and adapted to be connected to the inlet lines A–P. The pipe sections 2A-2P end on the righthand side in downwardly directed pipe elbows.

The first fixed pipe sections are connected to respective first deformable and identical pipes 3A through 3P, each pipe formed by two horizontal intermediate pipe sections 3'A through 3'P and 3"A through 3"P terminating at upwardly or downwardly directed pipe elbows. The elbow at the end of each of the first fixed sections 2A-2P is pivotably connected in a sealed manner by a pipe swivel joint to an elbow at the end of a corresponding first intermediate section 3'A-3'P to form a first vertical axis elbow articulation 4A-4P. Similarly, each horizontal intermediate pipe section 3'A-3'P is connected to one of the horizontal second intermediate pipe sections 3"A-3"P by a vertical axis second pipe swivel joint 5A-5P, and these horizontal intermediate pipe sections are connected by third vertical axis pipe swivel joints 6A-6P to a plurality of first pipe coupling sections 7A-7P. The various elbow end parts in these swivel joints come face to face in coincident horizontal planes.

Figure 3A:
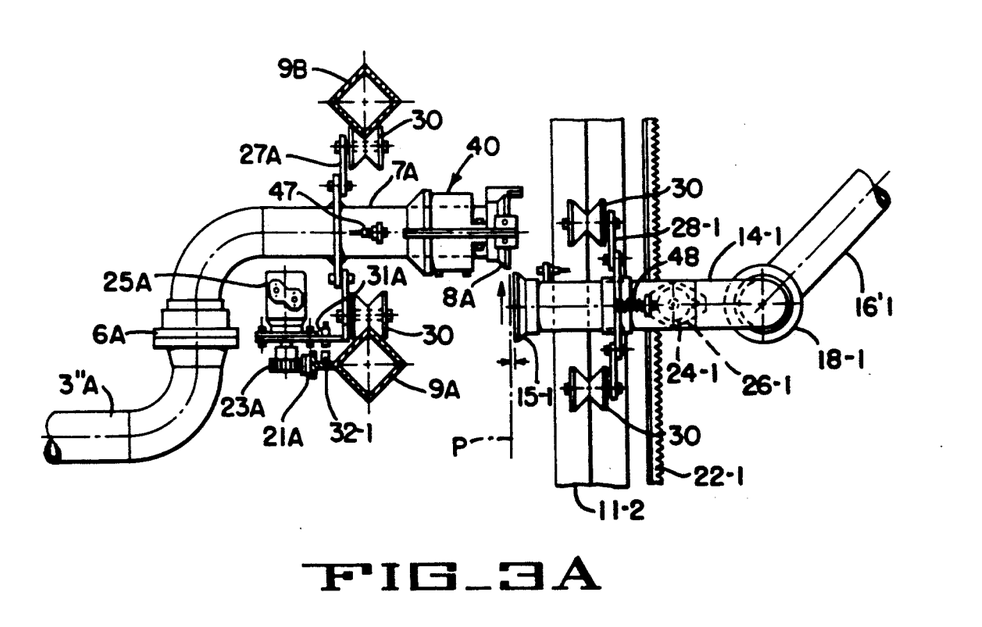
FIGS. 3A and 3B are views, on an enlarged scale, showing two successive steps of coupling an inlet pipe and an outlet pipe.
Figure 3B:
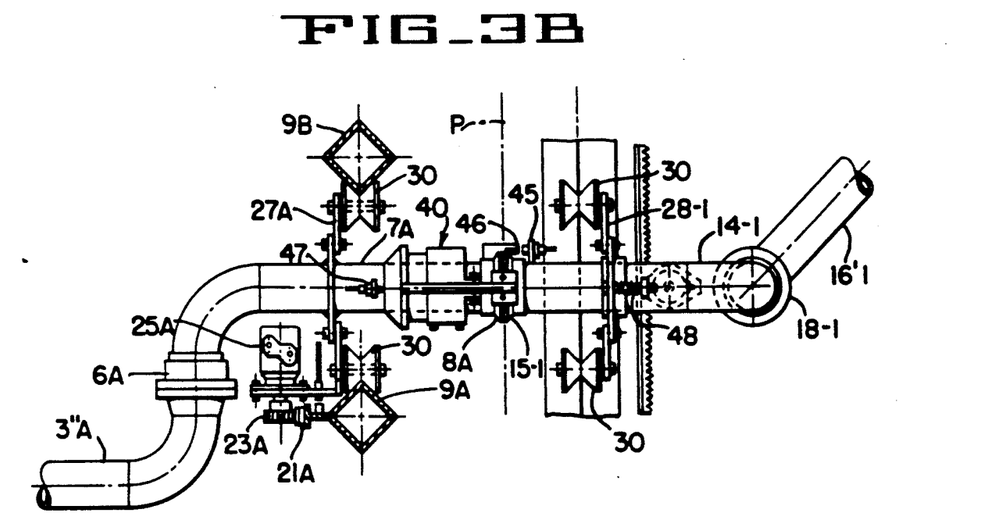

The first pipe coupling sections 7A-7P have parallel horizontal axes, and coplanar coupling flanges 8A through 8P along a common imaginary vertical coupling plane denoted P in FIGS. 3A and 3B. These first pipe coupling sections are movable along adjacent and horizontal guides 9A-9Q. The number of guides is one more than the number of pipe inlet sections, each first pipe coupling section passing between two guides. The guides are coplanar in a vertical plane, their ends being attached to a rectangular frame 10.

Facing the equidistant and horizontal first guides 9A-9Q, and parallel to them, is a plurality of equidistant and vertical guides 11-1 through 11-18 attached to a second vertical rectangular frame 12 fastened to the first frame 10 by crossmembers 13. Along these vertical guides are slidably mounted second pipe coupling sections 14-1 through 14-17 with parallel horizontal axes, the number of which is one less than the number of vertical guides, each second pipe coupling section passing through between two such guides. The second pipe coupling sections include coplanar coupling flanges 15-1 through 15-17 along the imaginary coupling plane P (FIGS. 3A and 3B).

Because the first and second frames 10 and 12 face each other, and because the first and second pipe coupling sections extend along the plane P but on respective sides thereof, any one of the first pipe coupling sections 7A-7P can be brought into alignment with any one of the second pipe coupling sections, and vice versa.

The second pipe coupling sections 14-1 through 14-17 are respectively connected to second deformable pipes 16-1 through 16-17 that are identical to each other and are formed by two intermediate pipe sections 16'-1 through 16'-17 and 16"-1 through 16"-17 disposed in respective parallel vertical planes. The second deformable pipes are connected to a horizontal series of second fixed sections 17-1 through 17-17 with coplanar parallel axes in a horizontal plane and adapted to be connected to the outlet lines.

The second pipe coupling sections, the intermediate sections and the second fixed sections have right angle elbow at their ends, directed towards the left or towards the right, conjointly forming first, second and third horizontal axis pipe swivel joints respectively denoted 18-1 through 18-17, 19-1 through 19-17, and 20-1 to 20-17. For the same deformable pipe these various elbows come face to face in swivel joints in coincident vertical planes.

It will be understood that the first deformable pipes 3A-3P are offset vertically and deform in planes parallel to the first horizontal guides 9A-9Q, and that the second deformable pipes 16-1 through 16-17 are offset horizontally and deform in vertical planes parallel to the vertical second guides 11-1 through 11-18. Also, the first and second fixed pipe sections, offset either vertically or horizontally, are disposed opposite each other and have parallel axes perpendicular to the imaginary coupling plane. In this way the set of first and second guides enables (optionally simultaneously) establishing communication between any of the first fixed pipe sections 2A-2P and any of the second fixed pipe sections 17-1 through 17-17.

The details of the guidance and coupling of the first and second pipe coupling sections is shown in FIGS. 3 through 6 with regard to a first coupling section 7A and a second coupling section 14-1.

The various guides 9A-9Q and 11-1 through 11-18 may have a cross-section in the shape of a prism, lozenge or square (in the illustrated embodiment). Along each guide but one (there is one more guide than there are pipe coupling sections) extends a rack 21A, etc., or 22-1, etc., with which meshes a pinion 23A, etc., or 24-1, etc., carried by the shaft of a motor 25A, etc., or 26-1, etc. (such as a slowly rotating hydraulic motor) on a carriage 27, etc., or 28-1, etc.

Each pipe coupling section is provided with two grooved rollers 30 (FIGS. 3A and 3B), made from polyurethane for example, adapted to roll on the facing edge of the guide for the carriage in question. Each first carriage 27A, etc. incorporates a position sensor 31A, etc. (in practice a proximity sensor), while on an associated horizontal guide 9A, etc., are bosses 32-1, etc., respectively associated with the second pipe coupling sections 14-1, etc., and adapted to be sensed by the position sensor 31A when the first coupling section 7A is aligned with the location into which the second pipe coupling section 14-1 associated with this boss must be brought in order to be coupled to that first pipe coupling section. Similarly, each second carriage 28-1, etc. incorporates a position sensor (not shown) analogous to the sensor 31A, etc. and adapted to sense any one of a series of bosses (not shown) provided on the vertical guide associated with the second carriage and respectively associated with the possible positions along this vertical guide of the various first pipe coupling sections. This enables accurate automatic positioning of the carriages by the motors. Although not shown, sensors indicating the end of, and thus limit travel on, the guides also are included in a preferred installation.

Figure 4:
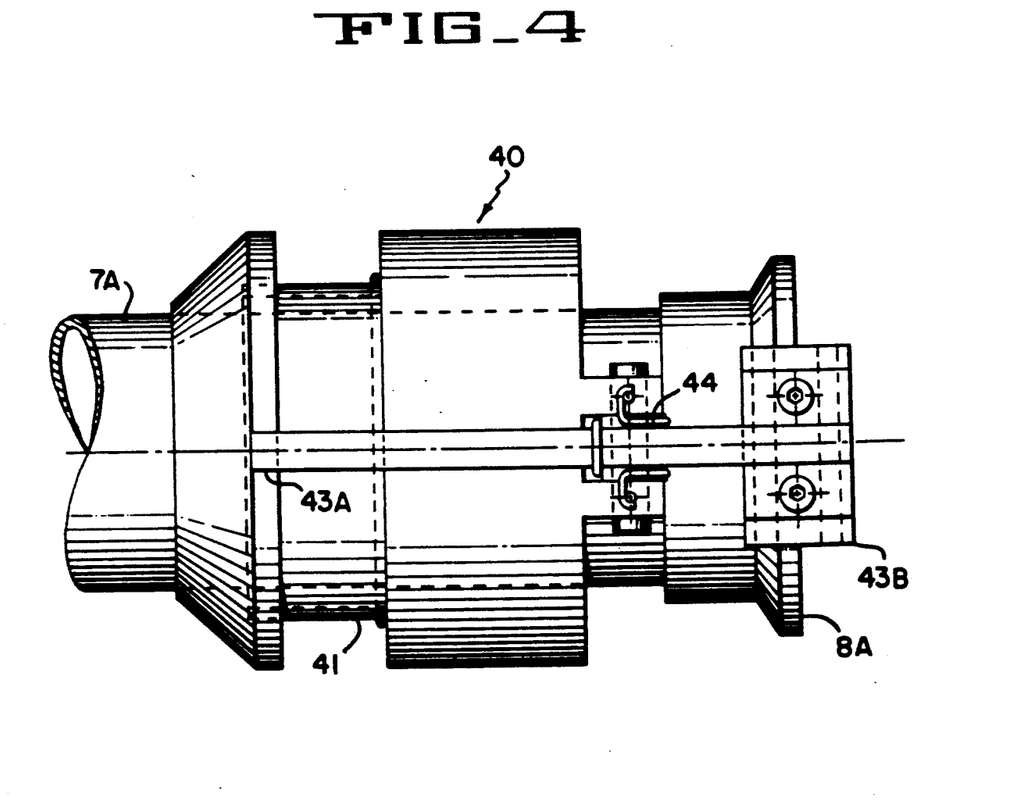
FIG. 4 is a view in side elevation, and on a yet larger scale, of a pipe coupler of FIGS. 3A and 3B.
Figures 5A, 5B:
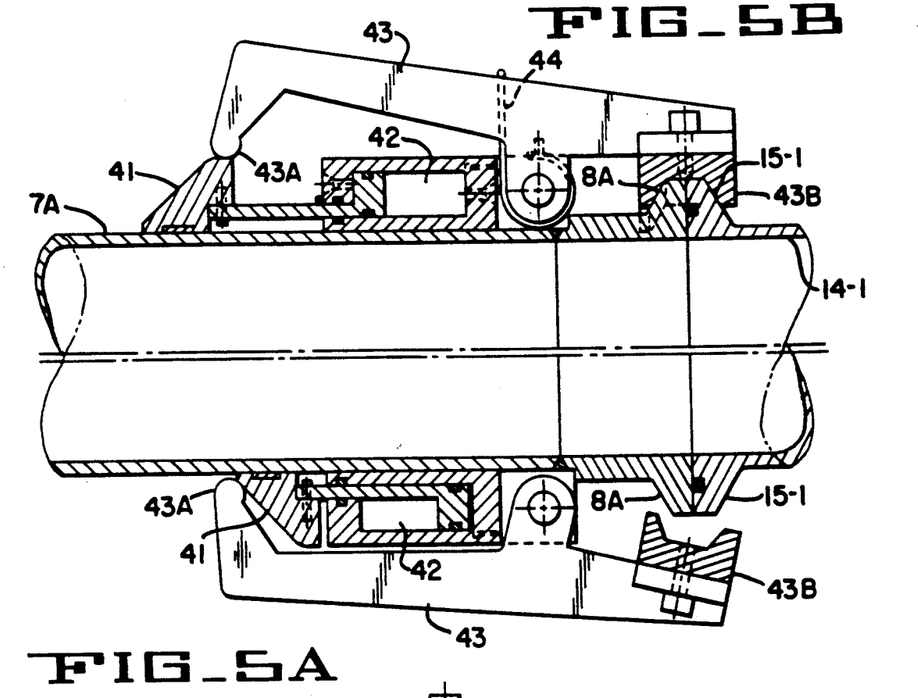
FIGS. 5A and 5B are views in vertical central section of the coupler of FIG. 4, showing it in, respectively, open and closed configuration.
Figure 6:
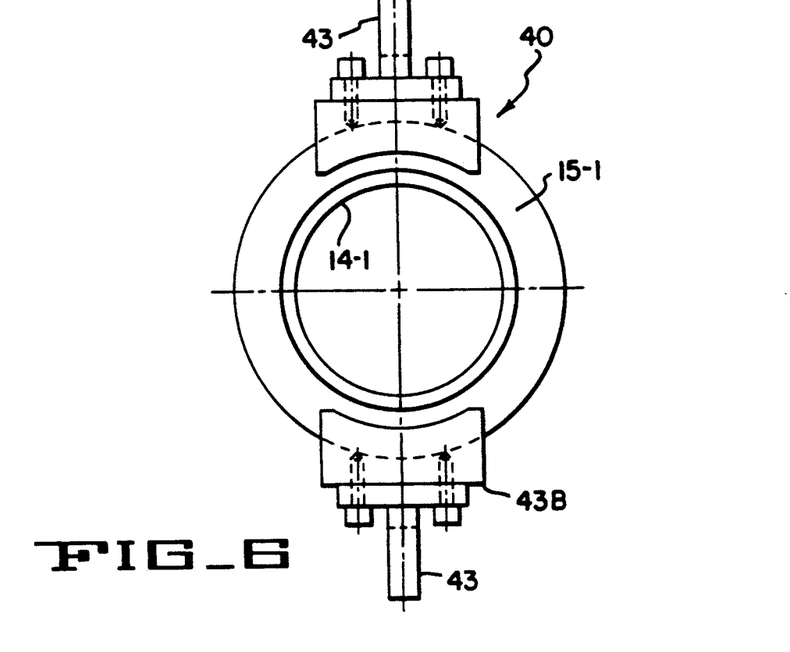
FIG. 6 is an end elevation of the coupler of FIG. 4.

Mounted on each of the first pipe coupling sections is a coupler 40 of any appropriate known type, in this instance hydraulically operated, as shown best and by way of example in FIGS. 4 through 6. The coupler 40 comprises a sleeve 41 forming a cam sliding axially on the coupling section in question (7A is shown) to define a variable volume chamber 42 communicating with a hydraulic control circuit, such as 50 in FIG. 7, and cooperating with a plurality of levers 43 substantially axially oriented with respect to transverse axes. Each lever 43 comprises a cam follower finger 43A at one end and, at the other end, a jaw 43B adapted to fit on and press together in a fluid-tight manner the flange 8A of the section 7A and the flange 15-1, etc. of the second pipe section to be coupled to that section 7A, and spring member 44 urges the jaws 43B apart. Sensor 45 (FIGS. 3A and 3B) are provided on each of the second pipe coupling sections to sense abutment members 46 of the first pipe coupling sections, thereby monitoring the presence of one of the first pipe coupling sections and the open or closed condition of the coupler 40. Additionally, sensors 47 are provided to monitor the open/-closed state of the coupler.

To provide some play, such as a few millimeters, between the flanges of the first and second pipe coupling sections during their relative movement, and to avoid any damage to their contacting surfaces and the gaskets provided on them a resilient system comprising springs 48 (FIGS. 3A and 3B) is preferably provided between the flanges 15-1, etc. and the associated carriages so as to force these flanges apart when the jaws of the associated coupler are moved apart.

FIG. 7 shows the main component parts of an automatic control system for an installation of this kind, the system comprising a hydraulic circuit 50 associated with a programmable automatic controller 51, a display screen 52, and an optional manual control station 53.

The circuit 50 includes a power source 54 of any appropriate known kind (for example a pump rated at 12 liters/minute at a pressure of 140 bars) and, associated with each first or second fixed pipe section, a distribution unit 55A, etc., 56-1, etc. and hoses (not shown) connected to the motors 25A, etc., 26-1, etc. and to the couplers 40. During translation movement of each coupling section the associated position sensor (31A, for example, as seen in FIG. 3A) sends a pulse to the automatic controller each time that it senses a boss (32-1, for example). These pulses are counted and memorized by the automatic controller which therefore knows the position of each coupling section. One such automatic controller suitable for this purpose is a TELEMECANIQUE TSX47/30 that receives the signals from the various sensors and operates appropriately on the electrohydraulic components of the hydraulic circuit 50.

The screen 52 and an associated keyboard are used to input data and to display the status of the installation in real time, for example showing the respective displacements of the two pipe sections along a line and a column up to and including their coupling together. The operator selects the numbers/letters of the sections to be connected on the keyboard, and the screen shows the instantaneous positions of these two sections, whether available or not (i.e. uncoupled or still coupled to another section).

The connection operations are carried through in the following order (after any necessary decoupling has been carried out):

the horizontally movable section is moved to the selected point of connection, the screen showing the position in real time;

the vertically movable section is moved until the connection position is sensed;

the drive system is stopped and immobilized;

the hydraulic coupler is closed, this being verified by the monitor screen which shows that the connection has been made.

Transfer of fluid product through the connected pipes is then authorized, such as by appropriate signals produced in the automatic controller for use in the overall process.

Figure 8:
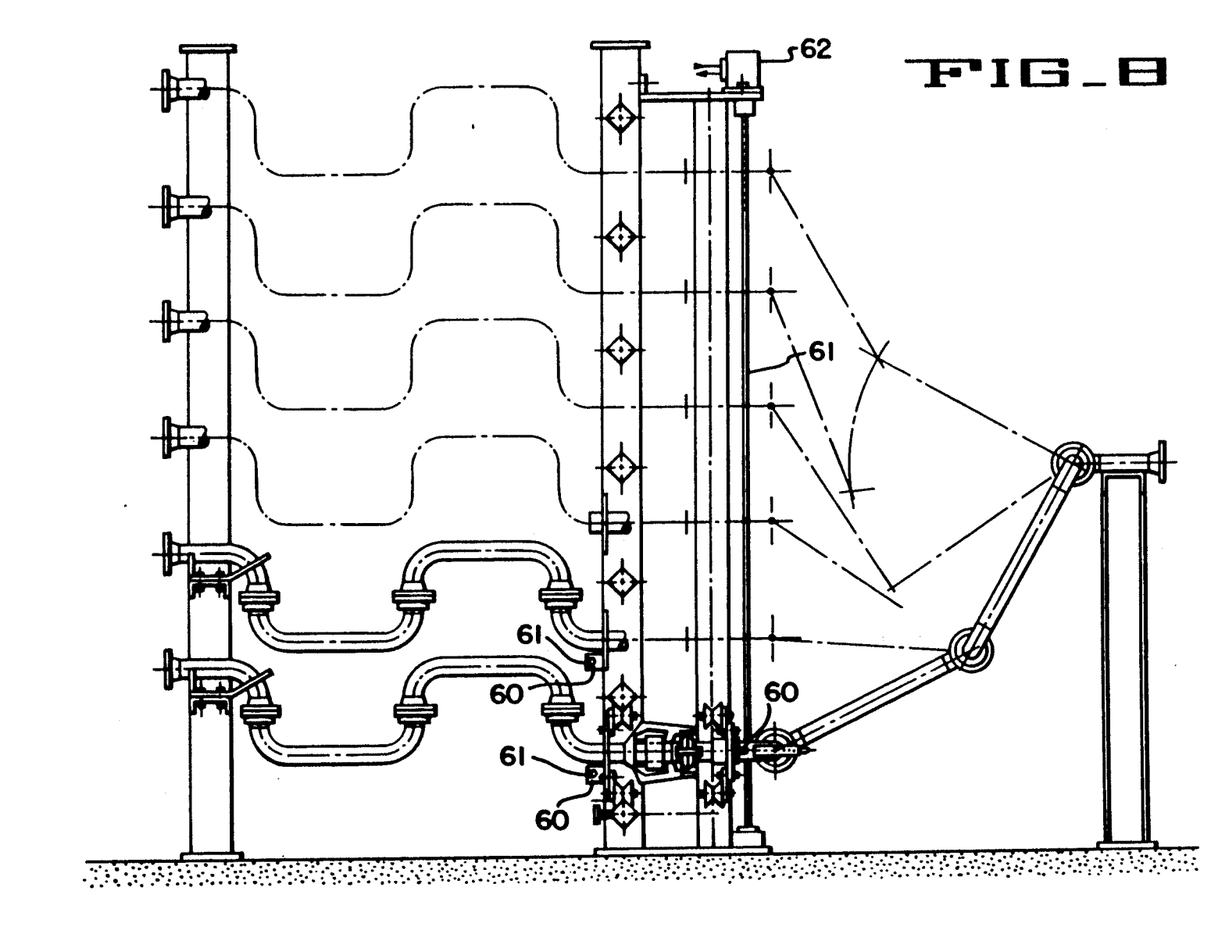
FIG. 8 is a view in elevation similar to FIG. 1, showing another selective connection apparatus incorporating an alternative embodiment of the means for maneuvering the pipe coupling sections.

FIG. 8 shows an alternative embodiment of pipe connection apparatus in which the carriages are moved by nuts 60 fastened to the carriages and cooperating with screws 61 driven by fixed motors 62.

As an example of the size of a real-life apparatus according to the present invention, the frames 10 and 12 are about 10 meters high and 11 meters wide, the planes containing the axes of the first and second fixed pipe sections intersect these frames respectively along their vertical and horizontal median lines, the distance between adjacent pipe sections is 0.6 meter for outside diameters of 9.1 meter, and the first and second fixed pipe sections are separated by a distance of approximately 10 meters.

The foregoing description has been given by way of non-limiting example only, and numerous variations may occur to those skilled in the art without departing from the spirit and scope of the invention.

What is claimed is:

1. A pipe connection apparatus for selective and temporarily connecting any one of a plurality of first fixed pipe sections to any one of a plurality of second fixed pipe sections, said apparatus comprising:
   a) an ordered plurality of first articulated pipe sections each having a first and a second end;
   b) means for connecting the first ends of the first articulated pipe sections to a plurality of first fixed pipe sections, one end to one pipe section;
   c) an ordered plurality of first pipe coupling sections;
   d) means for connecting the first pipe coupling sections to the second ends of the first articulated pipe sections, one coupling section to one pipe section;
   e) means for supporting the first pipe coupling sections in an ordered and movable array defining a first imaginary plane;
   f) an ordered plurality of second articulated pipe sections each having a first and a second end;

g) means for connecting the first ends of the second articulated pipe sections to a plurality of second fixed pipe sections, one end to one pipe section;

h) an ordered plurality of second pipe coupling sections;

i) means for connecting the second pipe coupling sections to the second ends of the second articulated pipe sections, one coupling section to one pipe section;

j) means for supporting the second pipe coupling sections in an ordered and movable array defining a second imaginary plane parallel to the first imaginary plane; and k) means for connecting the first pipe coupling sections to the second pipe coupling sections in an imaginary coupling plane intermediate and parallel to the first and second imaginary planes.

2. A pipe connection apparatus according to claim 1 wherein each of the first pipe coupling sections comprises a pipe coupler, each of the second pipe coupling sections comprises a coupling flange, and each pipe coupler is cooperable with each coupling flange to interconnect any of the first and second articulated pipe sections.

3. A pipe connection apparatus according to claim 1 wherein the first and second fixed pipe sections, the first and second articulated pipe sections, and the first and second pipe coupling sections all have substantially the same inside diameter.

4. A pipe connection apparatus according to claim 1 wherein the means for connecting the first and second ends of the first articulated pipe sections to the first fixed pipe sections and the first pipe coupling sections, respectively, comprise pipe swivel joints.

5. A pipe connection apparatus according to claim 4 wherein the first articulated pipe sections comprise intermediate pipe sections that include at least two pipes interconnected by a pipe swivel joint.

6. A pipe connection apparatus according to claim 5 wherein the pipe swivel joints are oriented on parallel axes to facilitate articulation of the first articulated pipe sections in mutually parallel planes.

7. A pipe connection apparatus according to claim 4 wherein the means for connecting the first and second ends of the second articulated pipe sections to the second fixed pipe sections and the second pipe coupling sections, respectively, comprise pipe swivel joints.

8. A pipe connection apparatus according to claim 7 wherein the second articulated pipe sections comprise intermediate pipe sections that include at least two pipes interconnected by a pipe swivel joint.

9. A pipe connection apparatus according to claim 8 wherein the pipe swivel joints are oriented on parallel axes to facilitate articulation of the second articulated pipe sections in mutually parallel planes.

10. A pipe connection apparatus according to claim 1 wherein the first articulated pipe sections include means to facilitate articulation thereof on first mutually parallel planes.

11. A pipe connection apparatus according to claim 10 wherein the second articulated pipe sections include means to facilitate articulation thereof on second mutually parallel planes.

12. A pipe connection apparatus according to claim 11 wherein the first mutually parallel planes are perpendicular to the second mutually parallel planes.

13. A pipe connection apparatus according to claim 1 wherein the means for supporting the first pipe coupling sections comprise first carriages and first carriage guides, the guides residing in the first imaginary plane and in mutually parallel relationship, and the carriages including means to facilitate support and movement thereof along the guides.

14. A pipe connection apparatus according to claim 13 wherein the means for supporting the second pipe coupling sections comprise second carriages and second carriage guides, the second carriage guides residing in the second imaginary plane and in mutually parallel relationship, and the second carriages including means to facilitate support and movement of said second carriages along said second guides.

15. A pipe connection apparatus according to claim 14 wherein the first carriage guides are perpendicular to the second carriage guides.

16. A pipe connection apparatus according to claim 14 including motor means connected to the first and second carriages to move the carriages along the first and second guides, respectively.

17. A pipe connection apparatus according to claim 16 including a centralized automatic control system for controlling the motor means.

18. A pipe connection apparatus according to claim 14 wherein the first and second carriages include a position sensor adapted to sense markers characteristic of possible coupling locations of the carriage on its guide.

* * * * *